(12) United States Patent
Thelen

(10) Patent No.: US 11,301,782 B2
(45) Date of Patent: Apr. 12, 2022

(54) METHOD AND ARRANGEMENT FOR DETERMINING A CURRENT LOCATION SPEED-LIMIT IN A ROAD-VEHICLE

(71) Applicant: Zenuity AB, Gothenburg (SE)

(72) Inventor: Sebastian Thelen, Freising (DE)

(73) Assignee: ZENUITY AB, Gothenburg (SE)

( * ) Notice: Subject to any disclaimer, the term of this patent is extended or adjusted under 35 U.S.C. 154(b) by 23 days.

(21) Appl. No.: 16/998,283

(22) Filed: Aug. 20, 2020

(65) Prior Publication Data

US 2021/0065057 A1    Mar. 4, 2021

(30) Foreign Application Priority Data

Aug. 30, 2019   (EP) .................................... 19194515

(51) Int. Cl.
*G06N 20/00*     (2019.01)
*G01C 21/36*     (2006.01)
(Continued)

(52) U.S. Cl.
CPC ......... *G06N 20/00* (2019.01); *G01C 21/3697* (2013.01); *H04L 67/10* (2013.01); *H04L 67/18* (2013.01)

(58) Field of Classification Search
CPC ......... H04L 67/18; H04L 67/10; G06N 20/00; G01C 21/3697
See application file for complete search history.

(56) References Cited

U.S. PATENT DOCUMENTS

2015/0246676 A1* 9/2015 Keren .................... G01S 19/13
701/93
2015/0312327 A1* 10/2015 Fowe ........................ B60R 1/00
701/23

(Continued)

FOREIGN PATENT DOCUMENTS

KR    1020190060162    6/2019

OTHER PUBLICATIONS

Li Yuan et al: "Pushing the "Speed Limit": High-Accuracy US Traffic Sign Recognition With Convolutional Neural Networks", IEEE Transactions on Intelligent Vehicles, IEEE, vol. I, No. 2, Jun. 1, 2016.

*Primary Examiner* — El Hadji M Sall
(74) *Attorney, Agent, or Firm* — Duane Morris LLP; Gregory M. Lefkowitz

(57) ABSTRACT

Described herein is a method of determining a current location speed-limit in a road-vehicle (1) speed-limit information system (2). One or more signals (3, 4) corresponding to respective candidate speed-limits for the current location are received. A parametrized heuristic algorithm with an associated cost function is applied (7) to decide which candidate speed-limit (3, 4), if any, that is applicable. If available for the current location, a cloud service (8) supplied estimated true speed-limit (9) and an associated confidence in this estimate is received. An online learning or a reinforcement learning method is used to, based on the cloud service (8) supplied estimated true speed-limit (9) and the associated confidence in that estimate, constantly fit (10) the heuristic's parametrization to, with a high confidence, reproduce the cloud service (8) supplied estimated true speed-limit (9). A speed-limit information signal (11) corresponding to the decision of the parametrized heuristic algorithm is output.

15 Claims, 5 Drawing Sheets

(51) Int. Cl.
*H04L 67/10* (2022.01)
*H04L 67/52* (2022.01)

(56) References Cited

U.S. PATENT DOCUMENTS

| | | | |
|---|---|---|---|
| 2017/0061326 A1 | 3/2017 | Talathi | |
| 2017/0200061 A1 | 7/2017 | Julian | |
| 2017/0308759 A1 | 10/2017 | Mullen | |
| 2019/0236948 A1* | 8/2019 | Wang | G05D 1/0276 |
| 2020/0278830 A1* | 9/2020 | Krzyzanowski | H04W 4/44 |

* cited by examiner

METHOD AND ARRANGEMENT FOR DETERMINING A CURRENT LOCATION SPEED-LIMIT IN A ROAD-VEHICLE

CROSS-REFERENCE TO RELATED APPLICATIONS

This application claims priority to European patent application No. 19194515.3, filed on Aug. 30, 2019, the entire contents of which are incorporated herein by reference.

TECHNICAL FIELD

The present disclosure relates generally to validation of speed-limit information for road-vehicles, and in particular to a method of determining a current location speed-limit in a road-vehicle speed-limit information system as well as a road-vehicle speed-limit information system adapted to execute the method as well as a computer program comprising instructions that when executed by a processing circuit is configured to cause the road-vehicle speed-limit information system to execute the method.

BACKGROUND

Speed-limit information and speed control functions are state of the art driver assistance features for automobiles. Euro NCAP and other vehicle safety rating agencies include the presence and the performance of such features in their rating procedures. Correct speed-limit information in a given driving context is the basis to correctly inform the driver or to automatically adjust the set speed for speed control functions.

The speed-limit at a single location may vary over time for different reasons, e.g., authorities may change the speed-limit due to a changed risk assessment or it may be variable speed-limit that adapts to traffic conditions. A speed-limit may be conditional to, e.g., a given time of day, current weather, or vehicle category. Supplementary information may limit the applicability of a speed-limit sign to a certain distance.

Implementations of state-of-the-art speed-limit information systems typically use one or more information sources to infer the speed-limit, which is applicable to a vehicle in a certain driving situation. Typical examples for these information sources are vehicle mounted on-board cameras combined with appropriate image processing software including vision processing algorithms. The camera-based observation may be combined with on-board geospatial databases, like maps in a navigation system, often termed electronic horizon (EH), or off-board systems, like information processing services that may be accessed over an Internet connection. The different information sources may have very different operational characteristics that will cause them to supply contradicting information to a decision unit that has to select a single speed-limit value at any given time, e.g. to present to the driver.

For example, an on-board camera may recognize a road sign incorrectly. Especially supplementary signs with numerical information may sometimes be hard to correctly interpret in full. A road sign may be fully or partially obscured, covered, damaged, or positioned badly. Ambiguous sign locations may be hard to correctly associate to a road for interpretation by an algorithm, based on a short observation of the sign when passing it with a vehicle. Furthermore, an on-board geospatial database may be outdated after a change of a speed-limit or its information on a speed-limit may be wrong for other reasons.

When using road sign observations from on-board cameras to infer the currently valid speed-limit in a driving situation, information from other camera observations, e.g., lane markers, or additional sensors may be helpful to infer the occurrence of events others than road sign observations that may impact the validity of previous speed-limit information. Examples for such events are lane changes, turning from one road into another, or taking an on- or off-ramp. Based on the on-board camera observations and input from said additional sensors, some speed-limit information systems will have to decide what speed-limit to show to a driver and when not to show a speed-limit to the driver if the system cannot determine a currently valid speed-limit with high enough certainty.

When combining multiple on-board information sources, such as the above described camera and on-board geospatial database, they may supply contradictory information about the current speed-limit and then the speed-limit information system will normally have to choose to trust one source over the other. The state of the art uses various conditional heuristics, fine-tuned by engineers, to improve the likelihood to pick the correct information source in such a situation.

Thus, to carry out the various decisions described above, a speed-limit information system typically implements different parametrized heuristic algorithms that need to be fine-tuned by engineers in labor-intensive testing and verification procedures before bringing the system to market. The more time and resources that are spent on this tuning, the better is the resulting system performance as experienced by a customer that is driving the vehicle.

One mayor challenge in such tuning procedures, as described above, is to prevent tuning the speed-limit information system towards a limited test data set, that may not properly reflect all or some customers' driving routine. Furthermore, it is usually prohibitively expensive to provide different tunings for different driver clusters, i.e. groups of drivers who share a defining characteristic, where a distinction per market may be the best achievable outcome that is viable.

Supervised learning is a category of machine learning methods that use a set of input values for which the correct output values are known to train a speed-limit information system's behavior, e.g., as expressed by the above described decision algorithms. Hence, supervised learning is an optimization technique that may be used to support or replace the speed-limit information system's decision algorithm tuning, otherwise carried out by development engineers, as described above. Although supervised learning methods in this phase help to automate the decision algorithm's optimization, the process remains labor intensive because it requires a large enough dataset of labeled training data.

Deep artificial neural networks have in recent years drastically improved automated image and video classification capabilities that could help to mitigate some of the camera's weaknesses. The execution of such networks, however, requires powerful or at least specialized computation hardware. From a cost perspective, such hardware may be viable for highly autonomous driving platforms. For mass market advanced driver assistance systems, on the other hand, alternate solutions are assumed to still be more cost effective.

One attempt at improving determination of a current location speed-limit in a road-vehicle is presented by the document US 2017 0 308 759 A1, which discloses systems, methods, and devices for estimating a speed-limit for a vehicle. The disclosed system for estimating a speed-limit includes one or more perception sensors, an arbitrated speed component, an attribute component, an estimator component, and a notification component. The one or more perception sensors are configured to generate perception data about a region near the vehicle. The arbitrated speed component is configured to determine that a high confidence or arbitrated speed-limit is not available. The attribute component is configured to detect one or more environmental attributes based on the perception data. The estimator component is configured to determine an estimated speed-limit based on the environmental attributes. The notification component is configured to provide the estimated speed-limit to an automated driving system or driver assistance system of the vehicle.

Thus, US20170308759A1 aim to relate truth speed data to environmental attributes without taking any obtained speed-limit data into consideration and in some embodiments even use the obtained speed-limit data as truth speed data for training.

However, there is room for further improving determination of a current location speed-limit in a road-vehicle.

SUMMARY

An object of the present invention is to provide an improved method of determining a current location speed-limit in a road-vehicle speed-limit information system.

According to a first aspect there is provided a method of determining a current location speed-limit in a road-vehicle speed-limit information system, the method comprising: receiving one or more signals corresponding to respective candidate speed-limits for the current location; applying a parametrized heuristic algorithm with an associated cost function to decide which candidate speed-limit, if any, that is applicable receiving, if available for the current location, a cloud service supplied estimated true speed-limit and an associated confidence in this estimate; using an online learning or a reinforcement learning method, like stochastic gradient descent, incremental stochastic gradient descent, or recursive least squares, to, based on the cloud service supplied estimated true speed-limit and the associated confidence in that estimate, constantly fit the heuristic's parametrization to, with a high confidence, reproduce the cloud service supplied estimated true speed-limit; outputting a speed-limit information signal corresponding to the decision of the parametrized heuristic algorithm.

Thus, the above method allows for reducing the effort, and thus the associated cost, that has to be put into initial tuning of decision heuristics of road-vehicle speed-limit information systems. This as the online learning or reinforcement learning as used in the above method will provide for continuously improving the tuning of the decision heuristics of road-vehicles as they are operated and provide an increased confidence in a registered speed-limit value.

In a further embodiment the method further comprises executing the online learning or reinforcement learning method on-board an associated road-vehicle.

In a yet further embodiment the method further comprises uploading the parameters resulting from the fitting of the heuristic's parametrization and a cost function value that they achieve to a cloud service; aggregating by the cloud service the parameter values, possibly using an online learning or a reinforcement learning technique, together with parameters and cost function values received from multiple other vehicles to obtain by the aggregation a resulting parameter-set; downloading from the cloud service the resulting parameter-set back to the road vehicle; using the downloaded parameter set when applying the parametrized heuristic algorithm to decide which candidate speed-limit, if any, that is applicable.

In a still further embodiment the method further comprises using, in a continuous cycle, an absolute or relative threshold for an improvement of a cost function value that needs to be surpassed in order to upload or download a new parameter value set in either direction.

In an additional embodiment the method further comprises clustering road vehicles and their parameter optimization into driving environment profiles made up of one or more different clusters criteria.

In yet an additional embodiment the method further comprises performing the clustering of road vehicles and their parameter optimization into driving environment profiles with an unsupervised machine learning algorithm.

In a still further embodiment the method further comprises applying reinforcement learning techniques to the clustering.

In a yet further embodiment the method further comprises using a two-stage learning process that separates improving parameterization for a camera only solution, for providing a signal corresponding to a respective candidate speed-limit for the current location, and the parameters for the decision heuristics.

In yet an additional embodiment the method further comprises executing the online learning or reinforcement learning of new heuristics parameter sets in the cloud service by having each of multiple vehicles compute a cost function for online learning and upload to the cloud service the cost function value, sufficient information to identify the heuristic's parameter values that the cost function value is based on and, when applicable, additional information for clustering, and using this information, executing in the cloud service the online learning to optimize the heuristic's parameters and sending the resulting, new parameters to connected road-vehicles, and using in the respective road vehicles these received updated parameters when deciding which candidate speed-limit, if any, that is applicable.

In a still further embodiment the method further comprises sending updated heuristics parameters to groups of road-vehicles from one cluster in stages, so that there will be one or more control groups that uses a previous set of heuristics parameters; comparing, in the cloud service, the cost function values of the groups that use the updated new heuristic parameters with the groups that use the old heuristics parameters where the comparison of cost function values from different groups is based on cost function values collected in the same time window; deciding if the updated new heuristic parameters improve the cost function value with statistical significance for a cluster of vehicles and if so sending, by the cloud service, the new parameters to additional groups of that cluster.

In yet one embodiment the method further comprises using for the comparison in the cloud service three or more generations of heuristics parameter sets, distributed to different groups; and deciding the currently best one or more heuristics parameter sets; and sending, by the cloud service, these currently best one or more heuristics parameter sets to additional groups.

According to a second aspect there is provided road-vehicle speed-limit information system having means adapted to execute the steps of the herein described method.

In one embodiment is provided for a road-vehicle speed-limit information system, as above, further having means for wireless communication with an information processing service.

According to a third aspect there is provided a computer program comprising instructions that when executed by a processing circuit is configured to cause the herein described road-vehicle speed-limit information system to execute the herein described method.

According to a fourth aspect there is provided a carrier comprising the herein described computer program, wherein the carrier is one of an electronic signal, optical signal, radio signal or computer readable storage medium.

The above embodiments have the beneficial effects of providing for continuously improving the tuning of speed-limit decision heuristics of road-vehicles as they are operated.

BRIEF DESCRIPTION OF DRAWINGS

In the following, embodiments herein will be described in greater detail by way of example only with reference to attached drawings, in which.

DESCRIPTION OF EMBODIMENTS

In the following will be described some example embodiments of a method of determining a current location speed-limit in a road-vehicle 1 speed-limit information system 2.

Figure 1:
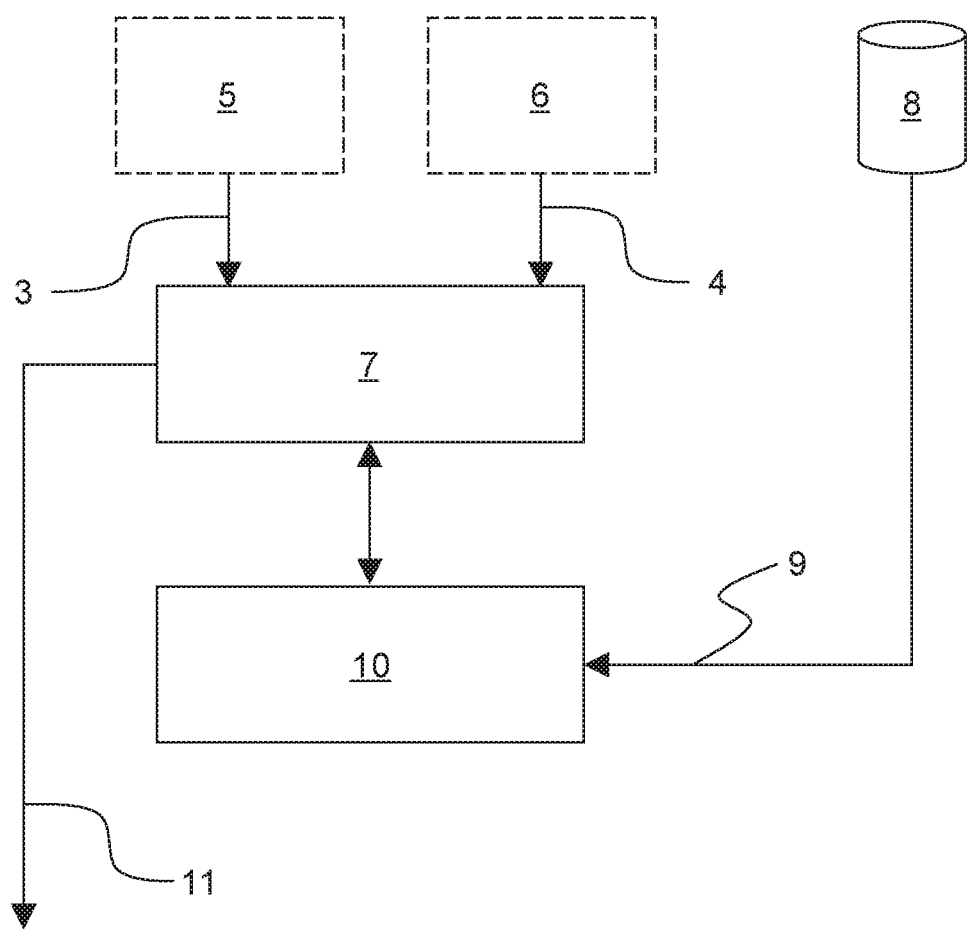
FIG. 1 illustrates schematically the proposed method of determining a current location speed-limit in a road-vehicle speed-limit information system.

The proposed method is, as illustrated schematically in FIG. 1, based on the realization that an online learning or a reinforcement learning method may be used to support a speed-limit information system's decision algorithm tuning, otherwise carried out by development engineers, as described in the foregoing.

Online learning is a method of machine learning in which data becomes available in a sequential order and is used to update our best predictor for future data at each step.

Reinforcement learning differs from supervised learning in that labelled input/output pairs need not be presented.

Thus, use of an online learning or a reinforcement learning method to tune a parametrized heuristic algorithm for deciding a speed-limit allows for a more cost efficient and less time consuming, labor intensive, solution as compared to previously known solutions.

It is furthermore based on the realization that estimated true speed-limits for different locations with associated confidences in those estimates obtained by a plurality of road vehicles may be previously uploaded to and stored in one or more databases of one or more remote servers, herein also denominated cloud service, and that such estimated true speed-limits may be combined with an online learning or a reinforcement learning method to tune a speed-limit decision algorithm to, with a high confidence, reproduce the cloud service supplied estimated true speed-limit based on the available candidate speed-limits for a current location.

A cloud service, as used herein, is any information processing service made available to users on-demand via a network connection, such as an Internet connection, from one or more servers of a cloud computing provider. Such services encompass the on-demand availability of computer system resources, especially tools and applications like data storage, servers, databases, networking, software and computing power. Such resources may be centralized, or distributed between multiple locations, e.g. located in one or more data centers, and may possibly also comprise distributed vehicle on-board resources. Cloud services may be delivered over the Internet and accessible globally from the Internet. Thus, the term "cloud service", as used herein is a broad term that incorporates all delivery and service models of cloud computing and related solutions.

Although, as mentioned above, a database of previously uploaded and stored estimated true speed-limits for different locations with associated confidences in those estimates obtained by a plurality of road vehicles is a pre-requisite for the herein described method, such a database and/or means or methods for obtaining estimated true speed-limits for different locations with associated confidences in those estimates and uploading such information to a cloud service is solely a pre-requisite for the herein described method and does not constitute any part thereof.

Thus, as illustrated schematically in FIG. 1, is proposed a method of determining a current location speed-limit in a road-vehicle 1 speed-limit information system 2. The method comprises receiving one or more signals 3, 4 corresponding to respective candidate speed-limits for the current location.

The one or more signals 3, 4 corresponding to respective candidate speed-limits may be received from road sign observations, acquired from a vehicle mounted camera 5, such as a forward-facing front view camera, having appropriate image processing software. Such observations may be combined with speed-limit information from an on-board, location referenced database 6, like a map, usually referenced using a Global Navigation Satellite System (GNSS), such as e.g. the satellite based global positioning system (GPS), to provide the respective candidate speed-limits.

The method further comprises applying a parametrized heuristic algorithm 7 with an associated cost function to decide which candidate speed-limit, if any, that is applicable.

In order to be able to tune the parametrized heuristic algorithm with its associated cost function the method further comprises receiving, if available for the current location, a cloud service 8 supplied estimated true speed-limit 9 and an associated confidence in this estimate.

Tuning 10 is performed using an online learning or a reinforcement learning method, like stochastic gradient descent, incremental stochastic gradient descent, or recursive least squares, to, based on the cloud service 8 supplied estimated true speed-limit 9 and the associated confidence in that estimate, constantly fit 10 the heuristic's parametrization to, with a high confidence, reproduce the cloud service 8 supplied estimated true speed-limit 9.

The method is concluded by outputting a speed-limit information signal 11 corresponding to the decision of the thus tuned parametrized heuristic algorithm 7.

Thus, the above method allows for reducing the effort, and thus the associated cost, that has to be put into initial tuning of decision heuristics of road-vehicle 1 speed-limit information systems 2. This as the online learning or reinforcement learning as used in the above method will provide for continuously improving the tuning 10 of the decision heuristics 7 of road-vehicles 1 as they are operated and provide an increased confidence in a registered speed-limit value 3, 4.

In embodiments hereof executing the online learning or reinforcement learning method may be executed on-board an associated road-vehicle 1.

In further embodiments hereof the method further comprises uploading the parameters resulting from the fitting 10 of the heuristic's parametrization and a cost function value that they achieve to a cloud service 8. The cloud service 8 aggregates the parameter values, possibly using an online learning or a reinforcement learning technique, together with parameters and cost function values received from multiple other vehicles to obtain by the aggregation a resulting parameter-set. The resulting parameter-set is then available for downloading from the cloud service 8 back to the road vehicle 1. The downloaded parameter set may then be used when applying the parametrized heuristic algorithm 7 to decide which candidate speed-limit, if any, that is applicable.

In still further embodiments hereof the method further comprises using, in a continuous cycle, an absolute or relative threshold for an improvement of a cost function value that needs to be surpassed in order to upload or download a new parameter value set in either direction.

In additional embodiments hereof the method further comprises clustering road vehicles 1 and their parameter optimization into driving environment profiles made up of one or more different clusters criteria.

Clustering criteria may e.g. be into geographic regions with similar configuration of road signs and speed-limits, based on the occurrence frequency of different sign categories, or based on the occurrence frequency of patterns in conflicts between different information sources.

In yet additional embodiments herein the method further comprises performing the clustering of road vehicles 1 and their parameter optimization into driving environment profiles with an unsupervised machine learning algorithm.

An unsupervised machine learning algorithm will infer patterns from a dataset without reference to known, or labeled, outcomes.

In still further embodiments herein the method further comprises applying reinforcement learning techniques to the clustering.

Reinforcement learning techniques are about taking suitable action to maximize reward in a particular situation. It is employed to find the best possible behavior in a specific situation. Reinforcement learning differs from supervised learning in that in supervised learning the training data has the answer key, so the model is trained with the correct answer itself, whereas in reinforcement learning there is no answer but the reinforcement agent decides what to do to perform the given task learning from its experience.

In yet further embodiments the method further comprises using a two-stage learning process that separates improving parameterization for a camera 5 only solution, for providing a signal 3 corresponding to a respective candidate speed-limit for the current location, and the parameters for the decision heuristics 7.

In yet additional embodiments the method further comprises executing the online learning or reinforcement learning of new heuristics parameter sets in the cloud service 8 by having each of multiple vehicles 1 compute a cost function for online learning and upload to the cloud service 8 the cost function value, sufficient information to identify the heuristic's parameter values that the cost function value is based on and, when applicable, additional information for clustering. Using this information, the online learning is executed in the cloud service 8 to optimize the heuristic's parameters and the resulting, new parameters sent to connected road-vehicles 1. These received updated parameters are then used in the respective road vehicles 1 when deciding which candidate speed-limit 3, 4, if any, that is applicable.

In still further embodiments the method further comprises sending updated heuristics parameters to groups of road-vehicles 1 from one cluster in stages, so that there will be one or more control groups that uses a previous set of heuristics parameters. In the cloud service 8, the cost function values of the groups that use the updated new heuristic parameters are compared with the groups that use the old heuristics parameters. The comparison of cost function values from different groups is based on cost function values collected in the same time window. This is concluded by deciding if the updated new heuristic parameters improve the cost function value with statistical significance for a cluster of vehicles 1 and if so sending, by the cloud service 8, the new parameters to additional groups of that cluster.

In additional embodiments the method further comprises using for the comparison in the cloud service 8 three or more generations of heuristics parameter sets, distributed to different groups. The currently best one or more heuristics parameter sets is decided. These currently best one or more heuristics parameter sets are sent, by the cloud service 8, to additional groups.

Figure 2:
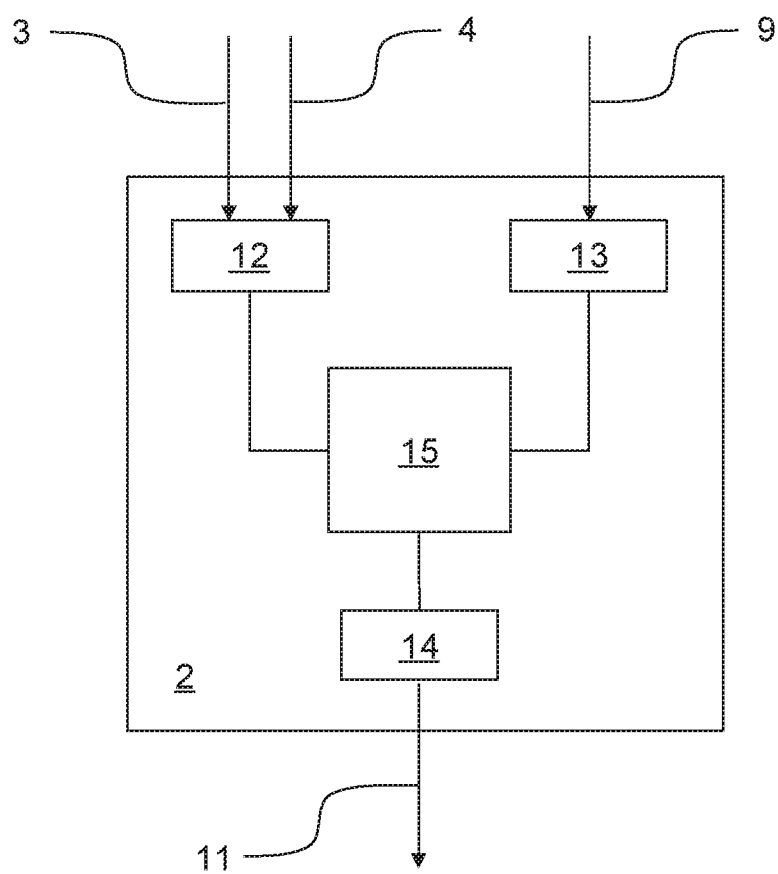
FIG. 2 illustrates schematically the road-vehicle speed-limit information system according to embodiments herein.

Further envisaged is a road-vehicle 1 speed-limit information system 2, as illustrated schematically in FIG. 2, having means adapted to execute the herein described method.

Such means may include one or more interfaces 12 for receiving the one or more signals 3, 4 corresponding to respective candidate speed-limits for the current location. They may also include one or more interfaces 13 for receiving, if available for the current location, the cloud service 8 supplied estimated true speed-limit 9 and the associated confidence in this estimate, and one or more interfaces 14 for outputting the signal 11 corresponding to the decision of the parametrized heuristic algorithm 7.

Figure 3:
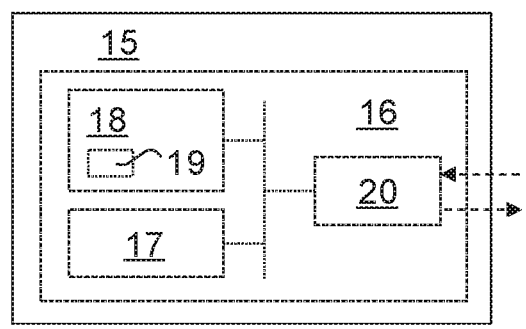
FIG. 3 illustrates schematically a data processing arrangement of the road-vehicle speed-limit information system according to embodiments herein.

The means may further comprise one or more data processing arrangements 15, as illustrated in FIG. 3, each including a processing module 16 generally including at least one processing circuit 17 comprising one or more processors and including at least one memory 18, the memory storing instructions, e.g. a computer program 19 (software), executable by the processing circuit 17, including instructions for carrying out the various steps and processes described herein. It usually also comprises an I/O module 20, providing for input of data to be processed and output of the results of such processing.

Figure 4:
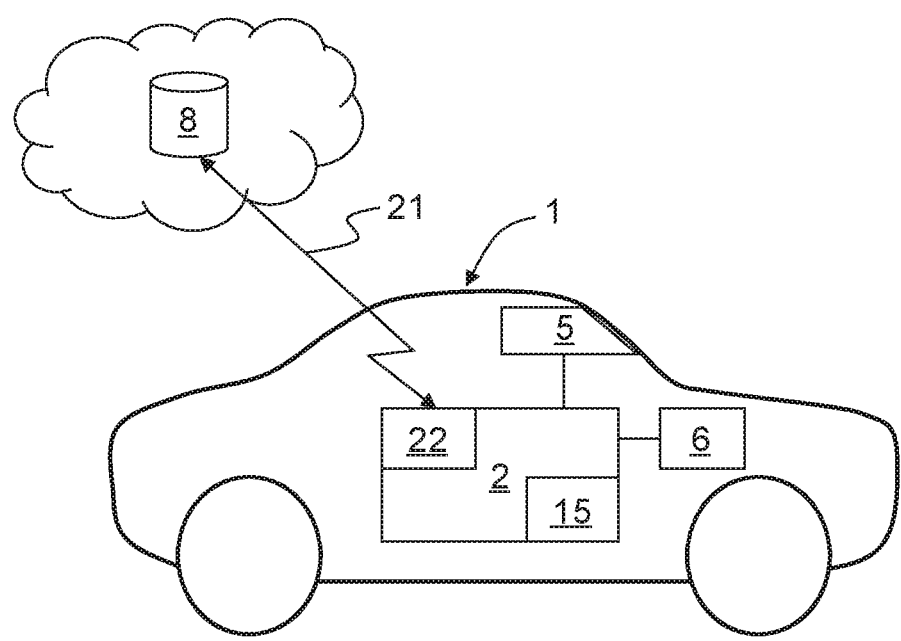
FIG. 4 illustrates schematically the speed-limit information system with the data processing arrangement arranged in the road vehicle according to some embodiments herein.

Furthermore, as illustrated in FIG. 4, using suitable communication channels, as illustrated by arrow 21, speed-limit information systems 2 of road-vehicles 1 may be arranged to be in communication with an information processing service 8, e.g. cloud service. Suitable communications channels may e.g., be based on technologies such as 4G and 5G networks, automotive WiFi etc.

Thus, in some embodiments is provided for a road-vehicle 1 speed-limit information system 2, as above, further having means for wireless communication 22 with an information processing service 8, such as a cloud service.

Still further is envisaged a computer program 19 comprising instructions that when executed by a processing circuit 17 is configured to cause the herein described road-vehicle 1 speed-limit information system 2 to execute the herein described method. The processing circuit 17 may comprise a set of one or more processors (not shown).

Figure 5:
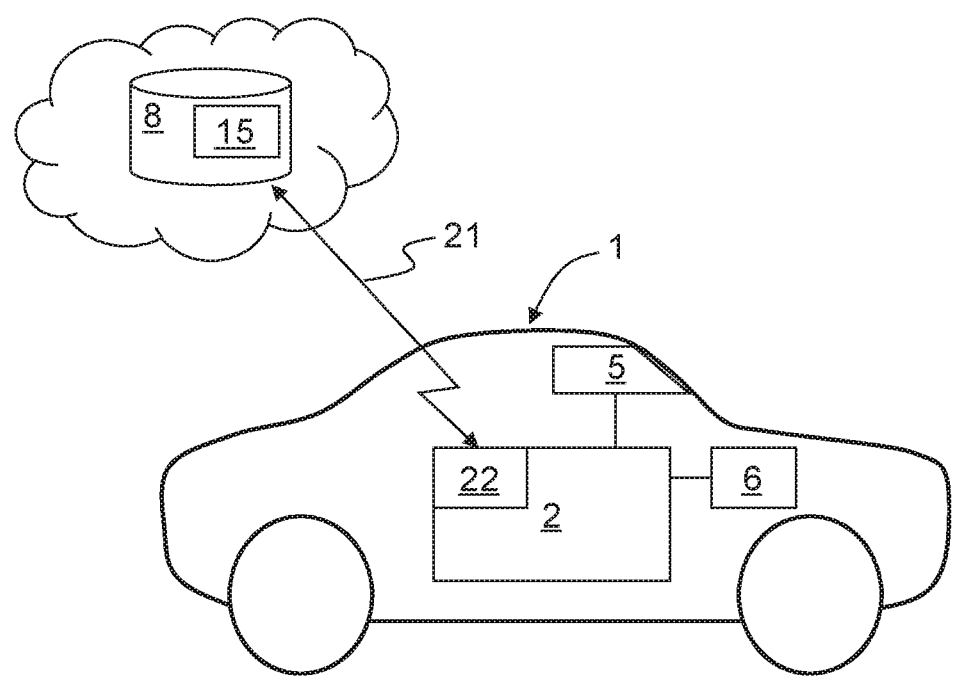
FIG. 5 illustrates schematically the road-vehicle with the data processing arrangement arranged at a remote server, according to other embodiments herein.

The data processing arrangement 15 comprising the processing circuit 17 may be arranged in the road-vehicle 1 speed-limit information system 2, as illustrated in FIG. 4, or at a location remote from the road vehicle, e.g. a remote server, as illustrated in FIG. 5.

In embodiments where the data processing arrangement 15 comprising the processing circuit 17 is arranged at a remote server 8 the herein described method may e.g. be implemented through continuously streaming data between the data processing arrangement 15 comprising the processing circuit 17 and the road vehicle 1. Streaming is the delivery of content in real-time, as events happen, i.e. transferring a continuous stream of data.

Thus, the system 2 or the remote server 8 may comprise the one or more data processing arrangements 15 each including the processing module 16 generally including the at least one processing circuit 17 comprising the one or more processors and including the at least one memory 18, storing instructions 19, e.g. the computer program (software), executable by the processor 17, including instructions for carrying out the various steps and processes described herein, and also comprising the I/O module 20, providing for the input of data to be processed and the output of the results of such processing.

Communication, e.g. streaming, of data between the road vehicle 1 and the data processing arrangement 15 comprising the processing circuit 17 located at such a remote server 8, e.g. cloud service, and back to a road vehicle 1 speed-limit information system 2 may further include a communication network, e.g. as illustrated by arrow 21, connected to the remote server 8. Such a communication network represents one or more mechanisms by which a road vehicle may communicate with the remote server 8. Accordingly, the communication network may be one or more of various wireless communication mechanisms, including any desired combination of wireless, e.g., radio frequency, cellular, satellite, and microwave communication mechanisms and any desired network topology. Exemplary communication networks include wireless communication networks, e.g., using Bluetooth, IEEE 802.11, LTE, 5G, etc.

Also envisaged herein is a carrier (not shown) comprising the herein described computer program 19, wherein the carrier is one of an electronic signal, optical signal, radio signal or computer readable storage medium.

The above embodiments have the beneficial effects of providing for continuously improving the tuning of speed-limit decision heuristics 7 of road-vehicles 1 as they are operated.

The effort that has to be put into the initial tuning of the decision heuristics 7 of the speed-limit information system 2 may be reduced, because the online or reinforcement learning system will continuously improve the tuning of vehicles 1 as they are operated. Furthermore, with the help of the described clustering into different driving environments, it is possible to have individual tuning outcomes for different environments on a finely grained level that fit the individual environments well and offer improved system performance in different environments than what is achievable when treating different environments the same.

The continuous tuning is carried out using real world driving and adapts to changing environments. This is hardly achievable when only tuning decision systems upfront. Also, when the reinforcement learning of the tuning parameters is connected to a cloud service 8 or performed there, as suggested herein, it is further possible to use the constantly improved tuning parameters to update the decision systems 2 of newly produced road-vehicles 1 that are about to leave a factory, which also is applicable to road-vehicles without connectivity or an onboard map system 6.

A road-vehicle 1 that is equipped with connectivity to the cloud service 8 will have limited use of this training while on a road section where the cloud service's map has been recently updated with high confidence, possibly with speed-limit decisions from other vehicles. The real benefit of the trained heuristics parameters arises when the vehicle 1 drives in a similar environment for which there is no recently updated, high confidence map information available, e.g., due to less vehicles driving there, lack of coverage of the connectivity supplier, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method of determining a current location speed-limit in a road-vehicle (1) speed-limit information system (2), the method comprising:
  receiving one or more signals (3, 4) corresponding to respective candidate speed limits for the current location;
  applying a parametrized heuristic algorithm (7) with an associated cost function to decide which candidate speed-limit (3, 4), if any, that is applicable;
  said method further comprising:
  receiving, if available for the current location, a cloud service (8) supplied estimated true speed-limit (9) and an associated confidence in this estimate;
  using an online learning or a reinforcement learning method, like stochastic gradient descent, incremental stochastic gradient descent, or recursive least squares, to, based on the cloud service (8) supplied estimated true speed-limit and the associated confidence in that estimate, constantly fit (10) the heuristic's parametrization to, with a high confidence, reproduce the cloud service (8) supplied estimated true speed-limit (9);

outputting a speed-limit information signal (11) corresponding to the decision of the parametrized heuristic algorithm.

2. The method according to claim 1, further comprising, executing the online learning or reinforcement learning method on-board an associated road-vehicle (1).

3. The method according to claim 2, further comprising:
uploading the parameters resulting from the fitting (10) of the heuristic's parametrization and a cost function value that they achieve to a cloud service (8);
aggregating by the cloud service (8) the parameter values, possibly using an online learning or a reinforcement learning technique, together with parameters and cost function values received from multiple other vehicles to obtain by the aggregation a resulting parameter-set;
downloading from the cloud service (8) the resulting parameter-set back to the road vehicle (1); and
using the downloaded parameter set when applying the parametrized heuristic algorithm to decide which candidate speed-limit (3, 4), if any, that is applicable.

4. The method according to claim 3, further comprising, using, in a continuous cycle, an absolute or relative threshold for an improvement of a cost function value that needs to be surpassed in order to upload or download a new parameter value set in either direction.

5. The method according to claim 3, further comprising, clustering road vehicles (1) and their parameter optimization into driving environment profiles made up of one or more different clusters criteria.

6. The method according to claim 5, further comprising, performing the clustering of road vehicles (1) and their parameter optimization into driving environment profiles with an unsupervised machine learning algorithm.

7. The method according to claim 6, further comprising, applying reinforcement learning techniques to the clustering.

8. The method according to claim 1, further comprising, using a two-stage learning process that separates improving parameterization for a camera (5) only solution, for providing a signal corresponding to a respective candidate speed-limit (3) for the current location, and the parameters for the decision heuristics.

9. The method according to claim 3, further comprising, executing the online learning or reinforcement learning of new heuristics parameter sets in the cloud service (8) by having each of multiple vehicles compute a cost function for online learning and upload to the cloud service (8) the cost function value, sufficient information to identify the heuristic's parameter values that the cost function value is based on and, when applicable, additional information for clustering, and using this information, executing in the cloud service (8) the online learning to optimize the heuristic's parameters and sending the resulting, new parameters to connected road-vehicles (1), and using in the respective road vehicles (1) these received updated parameters when deciding which candidate speed-limit (3, 4), if any, that is applicable.

10. The method according to claim 9, further comprising sending updated heuristics parameters to groups of road-vehicles (1) from one cluster in stages, so that there will be one or more control groups that uses a previous set of heuristics parameters; comparing, in the cloud service (8), the cost function values of the groups that use the updated new heuristic parameters with the groups that use the old heuristics parameters where the comparison of cost function values from different groups is based on cost function values collected in the same time window; deciding if the updated new heuristic parameters improve the cost function value with statistical significance for a cluster of vehicles (1) and if so sending, by the cloud service (8), the new parameters to additional groups of that cluster.

11. The method according to claim 10, further comprising using for the comparison in the cloud service (8) three or more generations of heuristics parameter sets, distributed to different groups; and deciding the currently best one or more heuristics parameter sets; and sending, by the cloud service (8), these currently best one or more heuristics parameter sets to additional groups.

12. A road-vehicle (1) speed-limit information system (2) having means adapted to execute the steps of the method of claim 1.

13. The road-vehicle (1) speed-limit information system (2) according to claim 12, further comprising means (22) for wireless communication (21) with an information processing service (8).

14. A computer program (19) comprising instructions that when executed by a processing circuit (17) is configured to cause the road-vehicle (1) speed-limit information system (2) of claim 12 to execute a method comprising:
receiving one or more signals (3, 4) corresponding to respective candidate speed-limits for the current location;
applying a parametrized heuristic algorithm (7) with an associated cost function to decide which candidate speed-limit (3, 4), if any, that is applicable;
said method comprising:
receiving, if available for the current location, a cloud service (8) supplied estimated true speed-limit (9) and an associated confidence in this estimate;
using an online learning or a reinforcement learning method, like stochastic gradient descent, incremental stochastic gradient descent, or recursive least squares, to, based on the cloud service (8) supplied estimated true speed-limit and the associated confidence in that estimate, constantly fit (10) the heuristic's parametrization to, with a high confidence, reproduce the cloud service (8) supplied estimated true speed-limit (9);
outputting a speed-limit information signal (11) corresponding to the decision of the parametrized heuristic algorithm.

15. A computer-readable storage medium comprising the computer program (19) according to claim 14.

* * * * *